June 30, 1970     J. E. ROCHTE     3,518,011
MICRO-VOLUME FLOW CELL

Filed Jan. 22, 1968     2 Sheets-Sheet 1

INVENTOR.
JERRY E. ROCHTE
BY

June 30, 1970  J. E. ROCHTE  3,518,011

MICRO-VOLUME FLOW CELL

Filed Jan. 22, 1968  2 Sheets-Sheet 2

INVENTOR.
JERRY E. ROCHTE

BY

ATTORNEY

United States Patent Office 3,518,011
Patented June 30, 1970

3,518,011
MICRO-VOLUME FLOW CELL
Jerry E. Rochte, Seal Beach, Calif., assignor to Beckman Instruments, Inc., a corporation of California
Filed Jan. 22, 1968, Ser. No. 699,521
Int. Cl. G01j 3/46; G01n 21/26
U.S. Cl. 356—181
10 Claims

ABSTRACT OF THE DISCLOSURE

A flow cell having a passageway movable into and out of alignment with a fluid flow line for trapping a section or column of fluid in the passageway for sampling, moving the passageway and sample into alignment with a sensing system for measuring the characteristics of the sample and then moving it back for return of the sample to the flow line.

---

The present invention relates generally to colorimetry and, more particularly, to colorimeter flow cells which handle small volumes of sample.

A major problem in connection with colorimetric examinations of small quantities of fluid samples utilizing flow cells of the prior art, is the difficulty in obtaining accurate and repeatable results. Often, this problem results from the introduction of obstructions of one sort or another into the flowing stream to divert or direct the flow so that an optical analysis over a path of sufficient length may be made. Disruption of the flow pattern in this manner causes turbulence which promotes the mixing of successive samples and the formation of bubbles, both of which adversely affect the accuracy and repeatability of the colorimetric measurements. With prior art cells, analyses are likewise affected by the lack of adequate flushing due to the limited amount of the sample available, directional changes of the flow path and volumetric differences between the sample flow line and the cell.

It is, therefore, an object of the present invention to provide a micro-volume flow cell which overcomes the aforementioned problems yet furnishes accurate and repeatable colorimetric readings.

Another object is the provision of a micro-volume flow cell which is simple in construction and is easily operated.

Ideally, it would be desirable to pass the sample through a constant diameter tube at low velocity and simultaneously obtain continuous colorimetric readings along a path extending lengthwise, that is, along the axis of the tube without any directional changes in the flow or the introduction of obstructions into the flow stream. The present invention approximates this ideal and, in accordance with its broad aspect, apparatus is provided for periodically removing a column or section of sample from a flow line and making a colorimetric determination with respect to a like column or section of reference fluid concurrently removed with the sample. Upon completion of the measurement, the removed sections of sample and reference fluids are returned to their respective flow lines to continue on their way.

Other objects, advantages and features of the present invention will become better understood by reference to the following detailed description when considered in connection with the accompanying drawing wherein.

Figure 1:
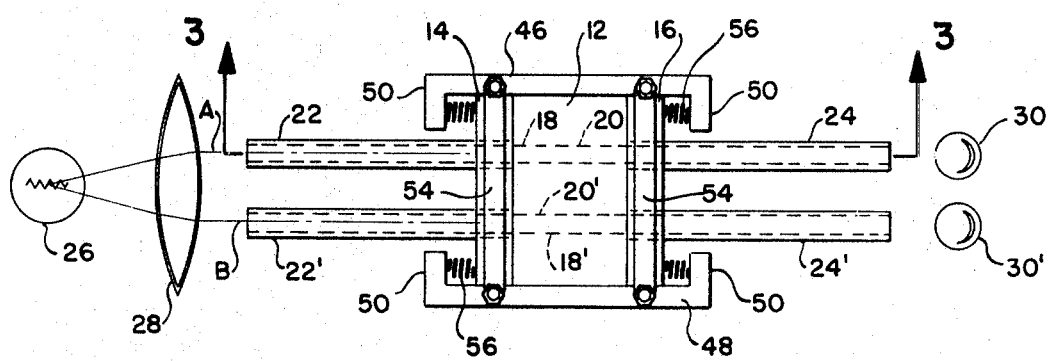
FIG. 1 is a top plan view of a schematic embodiment of the present invention showing the relation of the movable flow cell to the flow lines and sensing systems.
Figure 2:
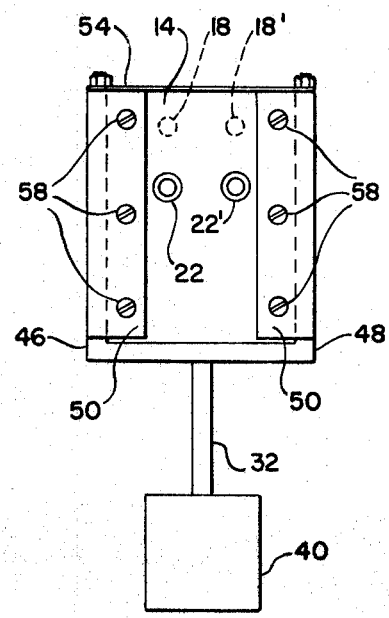
FIG. 2 is a side elevational view of the flow cell of FIG. 1.

Referring now to the drawing, there is shown in FIG. 1 a schematic embodiment of the present invention which includes a movable member 12 disposed between a pair of windows 14 and 16. Member 12 is formed with two pairs of spaced-apart through passageways or conduits 18, 20 and 18′, 20′, the passageways of each pair being vertically spaced as will be appreciated from a viewing of FIGS. 2 and 3. Passageways 18 and 20 are adapted to be placed in axial alignment with a sample fluid flow line of which only connecting pipes 22 and 24 are shown. Pipe 22 has one end inserted in an opening in window 14 and is suitably secured therein, pipe 24 being similarly related to window 16. In like manner, through passageways 18′ and 20′ are adapted to be aligned with a reference fluid flow line having connecting pipes 22′ and 24′ which are suitably connected to the windows. It is to be understood that alignment of passageways 18′ and 20′ with the reference fluid flow line takes place simultaneously with the alignment of their counterparts, passageways 18 and 20, respectively, with the sample fluid flow line.

Figure 3:
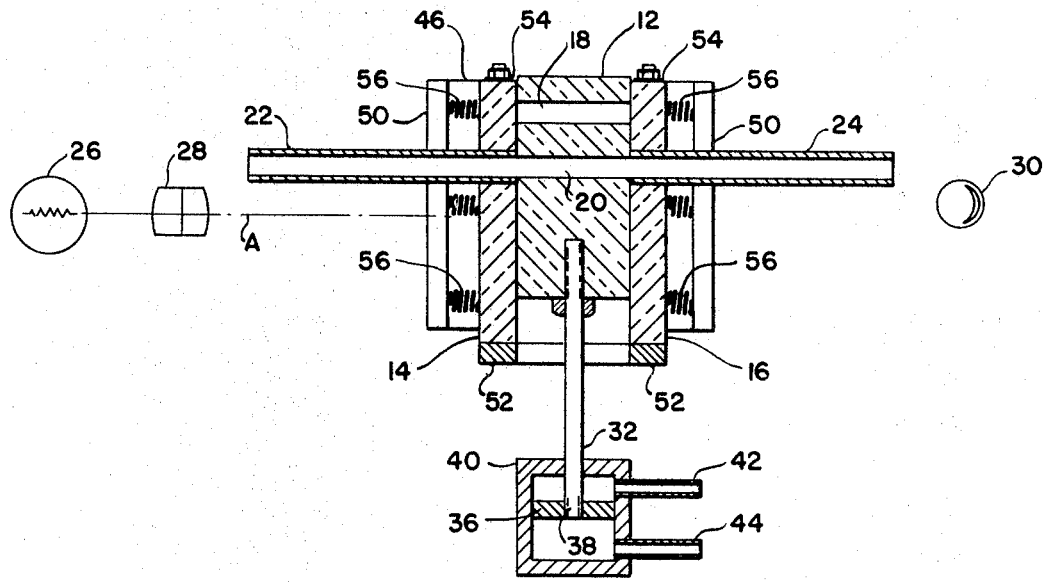
FIG. 3 is a sectional view taken generally along line 3—3 of FIG. 1 and showing the flow cell in one position in line with a flow line.
Figure 4:
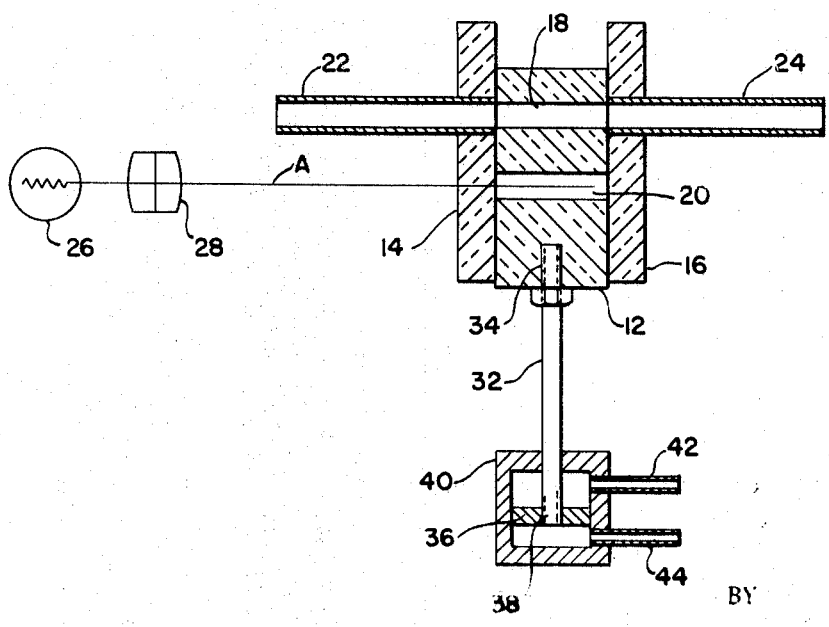
FIG. 4 is a view similar to FIG. 3 but with parts omitted and showing the flow cell in another position in line with the optical axis of a sensing system.

Movable member 12 is supported for movement between a position, as indicated in FIG. 3, wherein passageway 20 is in alignment or coaxial with pipes 22 and 24 and passageway 20′ is in alignment or coaxial with pipes 22′ and 24′, and the position shown in FIG. 4, wherein passageway 20 is in alignment or coaxial with the radiation beam A of a sensing system comprising a radiation source 26, lens system 28 and radiation sensitive means, such as a photocell 30, passageway 20′ at the same time being aligned or coaxial with a parallel sensing system having a radiation beam B and employing a photocell 30′ along with the same radiation source and lens system (FIG. 1). Beams A and B may be termed a "measuring beam" and a "comparison beam," respectively. Alternatively, the aforementioned sensing systems could be replaced with an optical system in which the radiation from source 26 is chopped and transmitted via beams A and B to a single photocell which is time shared between the beams.

Member 12 is moved from one position to the other by means of a connecting rod 32 secured to the member, as at 34, and to a fluid actuated piston 36, as at 38, the piston being housed in a piston chamber 40 and actuated by the introduction of fluid under pressure through conduits 42 and 44 in a manner well known in the art.

Member 12 is optically matched to the windows 14 and 16 and may be made of carbon or a fluorinated ethylene-propylene resin, or any other suitable material, the windows being of a material which is transparent to the radiation emanating from source 26. Windows 14 and 16 are suitably supported, for example, in a cage-like structure comprising side walls 46 and 48 having flanges 50 and held in spaced-apart relation by support members 52 and straps 54. Windows 14 and 16 rest upon members 52 and are resiliently urged into contact with movable member 12 by springs 56 or the like, the compression of which may be adjusted by means of set screws 58. The optical matching of the windows with the member provides a slidable sealing contact which prevents leaking at the interfaces of the member with the windows and movement of the member wipes the interior walls of the windows clean, removing any film that may be left by the fluid sample.

OPERATION

In the position of member 12 as shown in FIG. 3, in which passageway 20 is coaxially aligned with pipes 22 and 24 of the sample fluid flow line and passageway 20' is coaxially aligned with pipes 22' and 24' of the reference fluid flow line, fluids in the flow lines flow through passageway 20 and 20', respectively. When it is desired to sample the fluids, piston 36 is suitably actuated to move member 12 to the position shown in FIG. 4, such movement serving to cut out or trap a column or section of each of the fluids and place them in coaxial alignment with the radiation beams A and B of the respective sensing systems, thus providing optical paths through member 12 for the radiation emanating from source 26. The amounts of radiation from source 26 coming through to the photocells 30 and 30' via beams A and B are measures of the physical properties of the fluids which, when compared, are indicative of the analytical result sought. After the analytical measurement has been made, piston 36 is again actuated to replace passageways 20 and 20' in alignment with their respective flow lines and returning the sections of fluid thereto.

The purpose of passageways 18 and 18' is to provide bypass or alternate flow connections during the time that passageways 20 and 20' are in alignment with the radiation beams A and B. In cases where the flow of fluid is stopped for taking of the samples, passageways 18 and 18' are unnecessary.

When it is again desired to take samples, the aforedescribed procedure is repeated. Wiping of the windows clean by the sliding contact of the member 12 and the flow of fluid through passageway 20 in the interval between sampling server to substantially eliminate contamination by prior samples.

It is understood, of course, that suitable limit stops (not shown) may be provided to insure that member 12 is properly positioned in alignment with the flow lines or with the radiation beams and that the positioning of member 12 to align the passageways therein with the radiation beams is correlated with the measurements taken by the sensing systems in order that the analytical results be properly identified.

The micro-volume flow cell of the present invention finds particular use in wet chemical analyzers wherein the amount of fluid available from which the sample is to be taken is only about 0.25 cc. or less and is present in the flow line as a slug or section of sample fluid between longer sections or columns of flushing fluid or other samples. To avoid errors in measurement because of possible dilution of the sample by fluids other than the sample to be measured, only the central portion of the slug is taken. Accordingly, the cross-sectional dimensions of the passageways and flow lines are scaled down, sometimes to as small as 1 mm. diameter, in order to provide a sufficiently long section of fluid from which a pure sample with an ample optical path may be taken.

There has thus been provided a flow cell which overcomes the disadvantages of prior art cells and although only one embodiment of the present invention has been described, it will be appreciated that obviously many modifications and variations of the invention are possible in light of the above teachings. It is, therefore, to be understood that this invention is no tlimited to the specific embodiment illustrated and described but is defined only by the scope of the appended claims.

What is claimed is:

1. A device for transferring a sample from a flow line to sensing means and thereafter returning the sample to the flow line comprising, in combination:

movable means having a passageway therethrough adapted to be placed in alignment with a flow line and form a part thereof so that fluid in the flow line flows through the passageway; and actuatable means for moving said movable means for trapping a column of fluid in said passageway and placing it in alignment with a sensing means and thereafter returning it into alignment with the flow line.

2. The device as defined in claim 1 wherein:

said passageway when in alignment with said flow line is coaxial with a substantial length thereof;

said sensing system has a radiation beam; and said passageway when in alignment with said sensing means is coaxial with said radiation beam.

3. The device as defined in claim 2 further characterised in that:

said movable means is provided with another passageway similar to said first-named passageway and parallel thereto but spaced therefrom such that when said first-named passageway is placed in coaxial alignment with said radiation beam said second-named passageway is placed in coaxial alignment with said flow line, 4. The device as defined in claim 3 further characterized in that:

said first and second named passageways constitute a first pair of passageways adapted to be coaxially aligned with a sample fluid flow line in sequence;

said movable means is provided with a second pair of passageways which are the counterparts of said first pair of passageways but adapted to be coaxially aligned with a reference fluid flow line simultaneously with similar positioning of said first pair of passageways with said sample fluid flow line;

a second sensing system having a radiation beam; and one of the passageways of said second pair is adapted to be coaxially aligned with said radiation beam of said second sensing system simultaneously with one of the passageways of said first pair being coaxially aligned with the radiation beam of said first named sensing system.

5. Apparatus for performing colorimetric examinations of small quantities of fluid comprising, in combination:

a sensing system having a radiation beam;

a pair of spaced-apart windows through which said radiation beam passes;

a movable member between said windows in slidable sealing contact therewith, said member having an elongated passageway therethrough; and actuating means for moving said member between a first position in which said passageway is disposed in a fluid flow line with fluid from the flow line in said passageway and a second position in which said passageway with a section of fluid therein is disposed in coaxial alignment with said radiation beam of the sensing system.

6. The apparatus as defined in claim 5 wherein:

said passageway has a cross-sectional dimension which is relatively small compared to the length thereof.

7. The apparatus as defined in claim 6 wherein:

said cross-sectional dimension is in the order of one millimeter.

8. A method of performing colorimetric examination of a small quantity of fluid comprising the steps of:

(a) placing a conduit of small diameter in a fluid flow line;

(b) flowing fluid through said conduit;

(c) removing said conduit from said flow line and trapping an elongated column of fluid in said conduit; and (d) placing said conduit in coaxial alignment with the radiation beam of a sensing system.

9. The method as defined in claim 8 further comprising the step of:
  (e) replacing said conduit in said flow line and returning said column of fluid thereto.

10. The method as defined in claim 8 further characterized in that:
  simultaneously with the removal of said column of fluid from said flow line and placement thereof in coaxial alignment with said sensing system, an elongated column of fluid of small diameter is removed from a reference fluid flow line and placed in coaxial alignment with another sensing system; and
  comparing and measuring said columns of fluid.

References Cited

UNITED STATES PATENTS 2,496,333   2/1950   Cary et al.

RONALD L. WILBERT, Primary Examiner

C. CLARK, Assistant Examiner

U.S. Cl. X.R.

250—218